H. W. Weiss.
Manure Fork.
No. 84,452.  Patented Nov. 24, 1868.
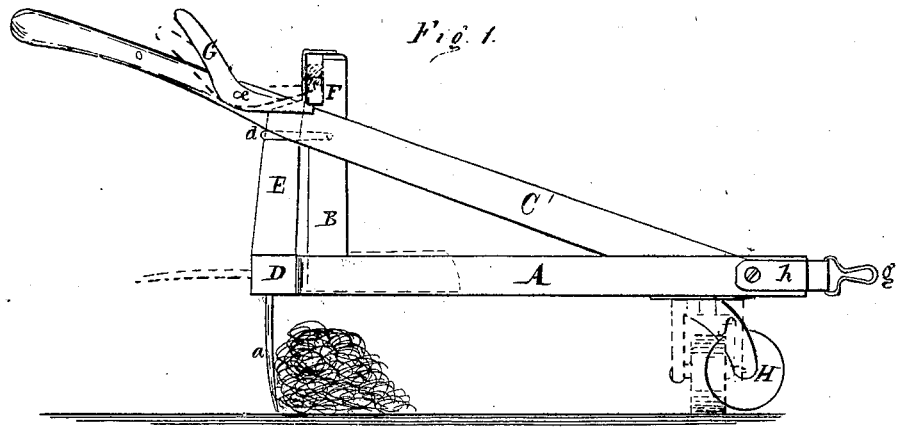
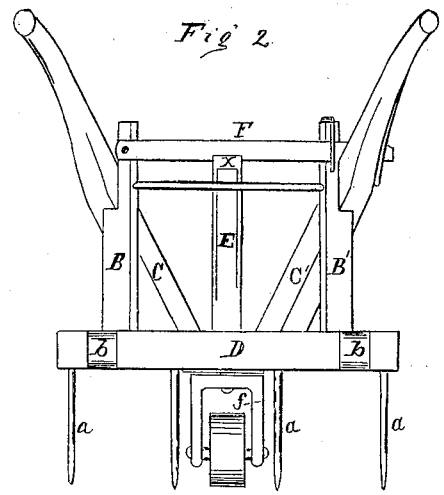
Witnesses:
Phil. H. Larner
Jacob F. Henry
Inventor:
Henry W. Weiss
By his Attorneys
Niedersheim & Co.

United States Patent Office.

HENRY W. WEISS, OF QUAKERTOWN, PENNSYLVANIA.

Letters Patent No. 84,452, dated November 24, 1868.

IMPROVEMENT IN DUNG-DRAG AND HOOK.

The Schedule referred to in these Letters Patent and making part of the same.

*To all whom it may concern:*

Be it known that I, HENRY W. WEISS, of Quakertown, in the county of Bucks, and State of Pennsylvania, have invented a useful and improved Dung-Drag or Hook; and I do hereby declare the following to be a full, clear, and exact description thereof, sufficient to enable those skilled in the art to which my invention appertains, to make and use the same, reference being had to the accompanying drawings, forming part of this specification, and in which—

Figure 1 is a side view, and

Figure 2, a rear-end view of my improved drag.

The object of my invention is to produce a simple and convenient implement for spreading manure, which shall be within the reach of the poorer class of agriculturists, and shall perform its work both effectually and expeditiously.

My invention consists in hinging to the rear end of a V-shaped frame, a transverse bar, in which are set several long teeth, and in providing means for raising the teeth from the ground, and retaining the bar in which said teeth are set in either position, together with other devices, perfecting the whole, as will hereinafter be more fully described.

In order that others may be enabled to fully understand my invention, I will now proceed to describe the construction and operation of my drag, referring to the accompanying drawings, in the several figures of which similar letters indicate corresponding parts.

A A represent the beams or side pieces, joined together at the front, and forming a V-shaped frame.

B B are uprights, fitted, one in each beam, A, near the rear end of the latter, and serving to support the inclined handles C C'. The forward ends of the latter are fixed to the beams A, near the junction.

D represents a wooden beam, in which a suitable number of teeth or tines, $a\ a$, is secured. This beam is fitted to turn in straps, $b$, affixed to the rear ends of the side pieces A.

A standard, E, is fixed centrally in the upper side of beam D.

The top, $x$, of standard E is bevelled, for a purpose to be hereinafter described.

When in the position shown in full black lines, the upper end of standard E rests against the rear side of a transverse stop-bar, F, pivoted at one end to the upright, B.

The stop F works in a guide, $c$, affixed to the opposite or right-hand standard, B', and rests upon the upper side of handle C'.

G is a curved lever, pivoted at $e$ to the outer side of handle C', its forward portion resting under the projecting part of stop F, while its opposite portion is extended upward, so as to be conveniently grasped by the hand to raise the stop F.

The upright, E, projecting from the hinged beam D, is prevented from falling backward by a curved guard, $d$, which is secured at its extremities in the standards B B'.

H represents a caster-wheel, hung in a frame, $f$, which is swivelled in the V-shaped frame of the drag, near its front. By the use of this swivelled wheel the manœuvering of the drag is greatly facilitated.

$g$ is a clevis, to which the harness of a horse may be attached. Said clevis is secured to the beams A, at their junction, by means of a strap, $h$.

When it is desired simply to move the drag from place to place, without putting it in actual operation, the attendant has only to depress the handle of lever G. The pivoted stop-bar F is thereby raised sufficiently to permit the passage of the standard E. As an immediate result, the teeth $a$, being in contact with the ground, and the drag moving forward, the bar D turns in the straps $b$, until the teeth $a$ and standard E assume the position shown in red lines, fig. 1.

The frame may now be supported by means of the handles, or it may be allowed to drag upon the ground, and easily moved about upon the swivelled roller H.

To restore the teeth to the working position, they may be depressed, by means of the foot, until the bevelled top of the standard E, coming in contact with the under side of the stop-bar F, raises said stop, and permits the passage of the standard, when the bar F at once falls.

Constructed substantially as above described, my drag constitutes an inexpensive and convenient implement, and one well adapted to perform its work in an expeditious and satisfactory manner.

Having thus described my invention,

What I claim as new, and desire to secure by Letters Patent, is—

The improved dung-drag, consisting of the rolling bar D, with teeth, $a$, and standard E, the pivoted stop-bar F, lever G, guard $d$, frame A B B' C C', and swivelled roller H $f$, all constructed and arranged to operate substantially as herein described.

To the above, I have signed my name, this 7th day of September, 1868.

HENRY W. WEISS

Witnesses:
MANOAH GEARY,
M. B. FELLMAN.